Patented Dec. 16, 1924.

1,519,755

UNITED STATES PATENT OFFICE.

FRANK F. B. CHAPMAN, OF NASHUA, NEW HAMPSHIRE, ASSIGNOR TO BURLOCK-WALFORD CO., INC., OF BOSTON, MASSACHUSETTS, A CORPORATION OF MASSACHUSETTS.

POWDERED PREPARATION FOR POULTICES.

No Drawing. Application filed December 13, 1923. Serial No. 680,405.

*To all whom it may concern:*

Be it known that I, FRANK F. B. CHAPMAN, a citizen of the United States, residing at Nashua, in the county of Hillsborough and State of New Hampshire, have invented new and useful Improvements in Powdered Preparations for Poultices, of which the following is a specification.

The object of the invention is to provide a dry powdered preparation, adapted to be preserved indefinitely while dry, and to be converted, by the addition of boiling water, into an adhesive paste of suitable consistency for local external application as a poultice, the preparation including a material or materials having germ-destroying properties, and a glutinous material serving as a binder.

The preferred materials, and the preferred proportions thereof, are as follows:

Boneset (*Eupatorium perfoliatum*) one pound.

Sweet fern (*Comptonia asplenifolia*) one pound.

Flax seed, one pound.

Each of said materials is reduced to a fine powder and the powdered materials are thoroughly mixed.

In preparing a poultice, sufficient boiling water is added to the mixture to form a paste, adapted to be retained by suitable confining means on any external surface requiring treatment. To the mixture above specified I preferably add about four ounces of ground eucalyptus leaves (*eucalyptus globulus*), although this material may be omitted. Ground flax seed or flax seed meal constitutes a suitable binder, this material being commonly used alone, water being added, in preparing poultices. Any other suitable glutinous material, such as wheat flour, may be employed.

The mixture above specified has been successfully used in poultice form as a specific for gangrene, septicæmia, and any infection of body tissues, such as carbuncles, boils, running sores, proud flesh, etc. It is also useful as a poultice for sprains, and in the treatment of pneumonia.

I ascribe the chief curative effects to the boneset and the sweet fern ingredients, these having a marked effect in destroying germs in cases of septicæmia, or other inflammation or infection.

I reserve the right to use any other suitable germ-destroying vegetable material or materials.

A particular advantage of a mixture of dry powdered vegetable materials including a germ-destroying material and a glutinous material, is found in the fact that the mixture may be indefinitely preserved in an air tight receptacle ready for use, and may be converted into a poultice simply by the addition of boiling water.

I claim:

1. A poultice preparation composed of a mixture of dry powdered vegetable materials including boneset, sweet fern, and a glutinous material.

2. A poultice preparation composed of a mixture of dry powdered vegetable materials including boneset, sweet fern, and flax seed.

3. A poultice preparation composed of a mixture of dry powdered vegetable materials including eucalyptus, boneset, sweet fern, and flax seed.

In testimony whereof I have affixed my signature.

FRANK F. B. CHAPMAN.